United States Patent
Wang (10) Patent No.: US 11,113,909 B2
(45) Date of Patent: Sep. 7, 2021

(54) DOOR HANDLE AND CONTROL METHOD THEREOF

(71) Applicant: Beijing Xiaomi Mobile Software Co., Ltd., Beijing (CN)

(72) Inventor: Peng Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/695,798

(22) Filed: Nov. 26, 2019

(65) Prior Publication Data

US 2021/0012596 A1    Jan. 14, 2021

(30) Foreign Application Priority Data

Jul. 12, 2019  (CN) .......................... 201910629975.3

(51) Int. Cl.
| | |
|---|---|
| *G07C 9/00* | (2020.01) |
| *E05B 1/00* | (2006.01) |
| *G06K 9/00* | (2006.01) |
| *E05B 49/00* | (2006.01) |

(52) U.S. Cl.
CPC ........ *G07C 9/00563* (2013.01); *E05B 1/0007* (2013.01); *G06K 9/0002* (2013.01); *E05B 49/00* (2013.01); *G06K 9/00288* (2013.01)

(58) Field of Classification Search
CPC ... G07C 9/00563; E05B 1/0007; E05B 49/00; G06K 9/0002
See application file for complete search history.

(56) References Cited

U.S. PATENT DOCUMENTS

| | | | |
|---|---|---|---|
| 2007/0204665 A1* | 9/2007 | Lie-Nielsen | ........ E05B 47/0676 70/472 |
| 2014/0165673 A1* | 6/2014 | Tyner | ...................... E05B 17/00 70/141 |
| 2017/0004577 A1 | 1/2017 | Cunningham | |

(Continued)

FOREIGN PATENT DOCUMENTS

| | | |
|---|---|---|
| CN | 105064789 A | 11/2015 |
| CN | 105239827 A | 1/2016 |
| CN | 205012759 U | 2/2016 |

(Continued)

OTHER PUBLICATIONS

First Office Action of Russian Application No. 2019141817/03 dated Jun. 10, 2020.

(Continued)

*Primary Examiner* — Nabil H Syed
(74) *Attorney, Agent, or Firm* — Finnegan, Henderson, Farabow, Garrett & Dunner, L.L.P.

(57) ABSTRACT

A door handle includes a human body detection sensor, a controller, a servo assembly, and an engaging assembly. The controller is electrically connected with the human body detection sensor and the servo assembly, and the engaging assembly is controlled by the servo assembly. The engaging assembly includes a first engaging state and a second engaging state. When the engaging assembly is in the first engaging state, the door handle is able to drive a lock body connecting shaft to rotate; and when the engaging assembly is in the second engaging state, the door handle is unable to drive the lock body connecting shaft to rotate.

7 Claims, 6 Drawing Sheets

(56) References Cited

U.S. PATENT DOCUMENTS

2020/0219347 A1\* 7/2020 Lv .................... E05B 47/0012
2020/0332563 A1\* 10/2020 Lai .................... E05B 49/00

FOREIGN PATENT DOCUMENTS

| CN | 205990836 U | 3/2017 |
| --- | --- | --- |
| CN | 206438857 U | 8/2017 |
| CN | 107217915 A | 9/2017 |
| CN | 108182749 A | 6/2018 |
| CN | 108590340 A | 9/2018 |
| CN | 208137674 U | 11/2018 |
| CN | 208225152 U | 12/2018 |
| CN | 208416145 U | 1/2019 |
| CN | 109577748 A | 4/2019 |
| CN | 110259268 A | 9/2019 |
| DE | 102008020726 A1 | 10/2009 |
| JP | 2009-268656 A | 11/2009 |
| JP | 2019019465 A | 2/2019 |
| KR | 100574688 B1 | 4/2006 |
| KR | 20080005303 U | 11/2008 |
| KR | 20110096955 A | 8/2011 |
| KR | 20150055891 A | 5/2015 |
| KR | 20160048253 A | 5/2016 |
| KR | 101874075 B1 | 7/2018 |
| KR | 101962783 B1 | 3/2019 |
| WO | WO 02/095170 A1 | 11/2002 |
| WO | WO 2018/151730 A1 | 8/2018 |

OTHER PUBLICATIONS

Extended European Search Report for European Application No. 19212386.7, dated Jun. 18, 2020.
International Search Report in International Application No. PCT/CN2019/108659, dated Apr. 13, 2020.
English version of International Search Report for PCT Application No. PCT/CN2019/108659 dated Apr. 13, 2020.
First Office Action dated Apr. 8, 2021, from The State Intellectual Property Office of People's Republic of China in counterpart Chinese Application No. 201910629975.3.

\* cited by examiner

DOOR HANDLE AND CONTROL METHOD THEREOF

CROSS-REFERENCE TO RELATED APPLICATIONS

The present application is based upon and claims priority to Chinese Patent Application No. 201910629975.3, filed on Jul. 12, 2019, the entire content of which is incorporated herein by reference.

TECHNICAL FIELD

The present disclosure relates to the technical field of smart homes, in particular to a door handle and a control method of the door handle.

BACKGROUND

Conventionally, door locks may be provided with peepholes on doors for users to observe conditions outside the doors. In the related art, in order to prevent a lawless person from opening a door through a peephole, a mechanical switch is added to an indoor door handle, and a pressing direction of the mechanical switch is perpendicular to a rotating direction of a traditional door handle. When the door is opened from the indoor, the mechanical switch needs to be pressed and the door handle needs to be rotated, so that the door can be opened from the indoor, thereby preventing from unlocking through the peephole and ensuring the indoor safety.

SUMMARY

According to a first aspect of the present disclosure, a door handle includes a human body detection sensor, a controller, a servo assembly, and an engaging assembly; wherein the controller is electrically connected with the human body detection sensor and the servo assembly, respectively, and the engaging assembly is controlled by the servo assembly; and the engaging assembly includes a first engaging state and a second engaging state, wherein the door handle is able to drive the lock body connecting shaft to rotate when the engaging assembly is in the first engaging state; and the door handle is unable to drive the lock body connecting shaft to rotate when the engaging assembly is in the second engaging state.

According to a second aspect of the present disclosure, a control method of the door handle is provided. The method includes: receiving sensor data of a human body detection sensor; instructing the servo assembly to control the engaging assembly to enter a first engaging state when a human body is detected according to the sensor data; and instructing the servo assembly to control the engaging assembly to enter a second engaging state when no human body is detected according to the sensor data.

According to a third aspect of the present disclosure, a door handle control device used in the controller in the door handle is provided. The door handle control device includes: a processor, and a memory storing instructions executable by the processor, wherein the processor is configured to: receive sensor data of the human body detection sensor; instruct the servo assembly to control the engaging assembly to enter the first engaging state when a human body is detected according to the sensor data; and instruct the servo assembly to control the engaging assembly to enter the second engaging state when no human body is detected according to the sensor data.

The technical solution provided by the embodiments of the present disclosure at least includes the following beneficial effects.

The door handle is installed corresponding to a lock body connecting shaft of the safety door lock. The door handle includes a human body detection sensor, a controller, a servo assembly and an engaging assembly. The controller is electrically connected with the human body detection sensor and the servo assembly, and the engaging assembly is controlled by the servo assembly. The engaging assembly includes a first engaging state and a second engaging state. When the engaging assembly is in the first engaging state, the door handle has the capability of driving the lock body connecting shaft to rotate; and when the engaging assembly is in the second engaging state, the door handle has no the capability of driving the lock body connecting shaft to rotate. The present disclosure uses cooperation of the human body detection sensor and the servo assembly, so that the servo assembly controls the engaging assembly to be in the first engaged state or the second engaged state, and the door handle has the capability of driving the locking body to rotate when the engaging assembly is in the first engaged state, so that the user can rotate the door handle and drive the lock body to rotate, so as to unlock and open the door without extra mechanical switches, and thus the present disclosure simultaneously possesses the function of preventing from unlocking through a peephole and improves the efficiency of opening the door.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute part of this specification, illustrate embodiments consistent with the present disclosure and, together with the description, serve to explain the principles of the present disclosure.

DETAILED DESCRIPTION

Reference will now be made in detail to the exemplary embodiments, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the present disclosure. Rather, they are merely examples of devices and methods consistent with certain aspects of the present disclosure, as detailed in the appended claims.

The solution provided by the present disclosure can be used in the scene that a user opens the door from the indoor in daily life. In embodiments of the present disclosure, a peephole is a small opening through a door, usually installed with a lens, for observing outdoor conditions from the indoor.

Figure 1A:
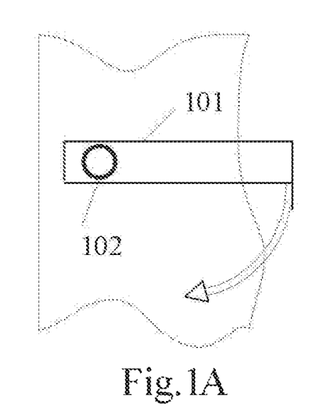
FIGS. 1A and 1B are schematic diagrams of an indoor door handle according to an embodiment.
Figure 1B:
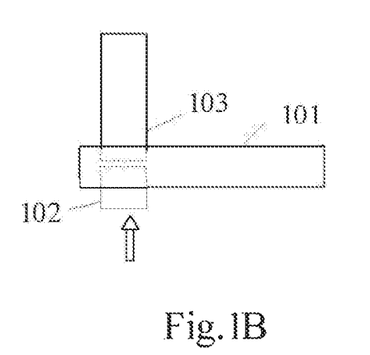

FIGS. 1A and 1B are schematic diagrams of an indoor door handle according to an embodiment. FIG. 1A is a front view of an indoor door handle, including a door handle 101 and a mechanical switch 102. FIG. 1B is a top view of the indoor door handle including the door handle 101, the mechanical switch 102, and a lock body connecting shaft 103. The lock body connecting shaft 103 may be connected with a lock core of a lock installed on the door, and the lock is unlocked by the rotation of the lock body connecting shaft. When a user wants to open the door from the indoor, the user may press the mechanical switch 102 in a direction of arrow (pressing direction) shown in FIG. 1B, and then turns the door handle 101 in the direction of the arrow (rotating direction) shown in FIG. 1A. Then, the door handle 101 is rotated and the lock body connecting shaft 103 is rotated in the same direction as the rotating direction of the door handle, thereby unlocking the lock installed on the door, and thus opening the door.

When the user opens the door from the indoor, it may be needed to hold the door handle and additionally press the mechanical switch, so that operation steps of opening the door from the indoor become complicated, and the door opening efficiency is reduced.

Figure 2:
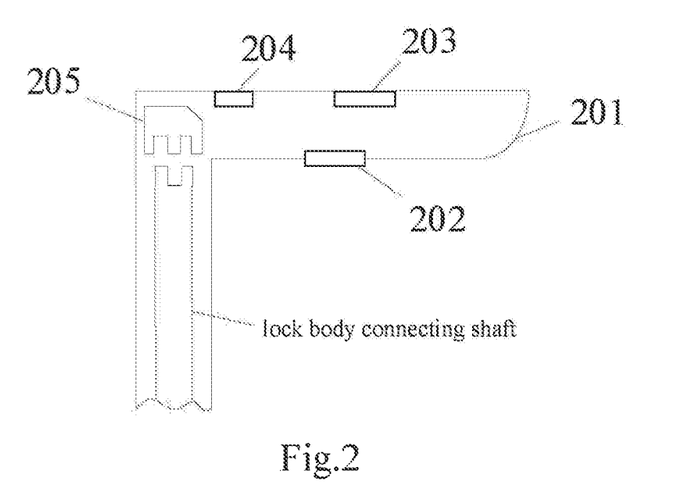
FIG. 2 is a schematic diagram of a door handle according to an embodiment.

FIG. 2 is a schematic diagram of a door handle according to an embodiment. As shown in FIG. 2, the door handle may be installed corresponding to a lock body connecting shaft of a safety door lock, and the lock body connecting shaft of the safety door lock may be the lock body connecting shaft shown in FIGS. 1A and 1B. As shown in FIG. 2, the door handle includes a handle housing 201, a human body detection sensor 202, a controller 203, a servo assembly 204 and an engaging assembly 205.

The controller 203 is electrically connected with the human body detection sensor 202 and the servo assembly 204, respectively, and the engaging assembly 205 is controlled by the servo assembly 204. The engaging assembly 205 includes a first engaging state and a second engaging state. The door handle has a capability of driving the lock body connecting shaft to rotate when the engaging assembly 205 is in the first engaging state; and the door handle has no the capability of driving the lock body connecting shaft to rotate when the engaging assembly 205 is in the second engaging state.

In an embodiment, the controller 203 is used to instruct the servo assembly 204 to control the engaging assembly 205 to enter the first engaging state when a human body is detected according to the sensor data of the human body detection sensor 202; and the controller 203 is used to instruct the servo assembly 204 to control the engaging assembly 205 to enter the second engaging state when no human body is detected according to the sensor data of the human body detection sensor 202.

In an embodiment, the engaging assembly 205 rotates with the handle housing 201, and the engaging assembly 205 is disposed in correspondence with the lock body connecting shaft. The engaging assembly 205 is engaged with the lock body connecting shaft when the engaging assembly 205 is in the first engaging state; and the engaging assembly 205 is disengaged from the lock body connecting shaft when the engaging assembly 205 is in the second engaging state.

In an embodiment, a first engaging structure is provided on one end of the engaging assembly 205 close to the lock body connecting shaft; the first engaging structure is engaged with a second engaging structure on one end of the lock body connecting shaft close to the engaging assembly 205 when the engaging assembly 205 is in the first engaging state; and the first engaging structure is disengaged from the second engaging structure on one end of the lock body connecting shaft close to the engaging assembly 205 when the engaging assembly 205 is in the second engaging state.

In an embodiment, the controller 203 is used to instruct the servo assembly 204 to control the engaging assembly 205 to move towards a direction close to the lock body connecting shaft when a human body is detected according to sensor data of the human body detection sensor 202, so that the engaging assembly 205 enters the first engaging state; and the controller 203 is also used to instruct the servo assembly 204 to control the engaging assembly 205 to move towards a direction away from the lock body connecting shaft when no human body is detected according to the sensor data of the human body detection sensor 202, so that the engaging assembly 205 enters the second engaging state.

In an embodiment, the human body detection sensor 202 includes at least one of the following sensors: a human body heat release infrared sensor disposed on the handle housing 201 of the door handle; a finger vein sensor disposed on the handle housing 201 of the door handle; a fingerprint sensor disposed on the handle housing 201 of the door handle; a touch sensor disposed on the handle housing 201 of the door handle; a face detection sensor disposed outside the handle housing 201 of the door handle; or an iris detection sensor disposed outside the handle housing 201 of the door handle.

In the above embodiments, the door handle is installed corresponding to a lock body connecting shaft of the safety door lock. The door handle includes a human body detection sensor, a controller, a servo assembly and an engaging assembly. The controller is respectively electrically connected with the human body detection sensor and the servo assembly, and the engaging assembly is controlled by the servo assembly. The engaging assembly includes a first engaging state and a second engaging state. When the engaging assembly is in the first engaging state, the door handle has the capability of driving the lock body connecting shaft to rotate; and when the engaging assembly is in the second engaging state, the door handle has no the capability of driving the lock body connecting shaft to rotate. The present disclosure uses cooperation of the human body detection sensor and the servo assembly, so that the servo assembly controls the engaging assembly to be in the first engaged state or the second engaged state, and the door handle has the capability of driving the locking body to rotate when the engaging assembly is in the first engaged state, so that the user can rotate the door handle and drive the lock body to rotate, so as to unlock and open the door without extra mechanical switches, and thus the present disclosure simultaneously possesses the function of preventing from unlocking through a peephole and improves the efficiency of opening the door.

Figure 3:
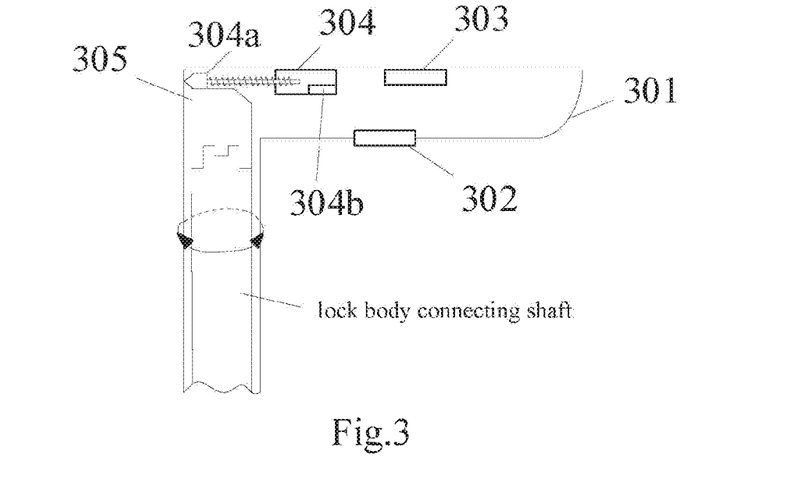
FIG. 3 is a schematic diagram of a door handle according to an embodiment.

In an embodiment, the servo assembly may include a motor and a motor drive shaft, and the first engaging state and the second engaging state of the engaging assembly are achieved by driving the motor drive shaft by the motor in the servo assembly. FIG. 3 is a schematic diagram of a door handle according to an embodiment. As shown in FIG. 3, the door handle may be installed corresponding to the lock body connecting shaft of the safety door lock, and the lock body connecting shaft of the safety door lock may be the lock body connecting shaft shown in FIGS. 1A and 1B. As shown in FIG. 3, the door handle includes a handle housing 301, a human body detection sensor 302, a controller 303, a servo assembly 304, and an engaging assembly 305.

The controller 303 is electrically connected with the human body detection sensor 302 and the servo assembly 304 respectively, and the engaging assembly 305 is controlled by the servo assembly 304. The engaging assembly 305 includes a first engaging state and a second engaging state; the door handle has a capability of driving the lock body connecting shaft to rotate when the engaging assembly is in the first engaging state; and the door handle has no the capability of driving the lock body connecting shaft to rotate when the engaging assembly is in the second engaging state.

As shown in FIG. 3, the human body detection sensor 302, the controller 303, the servo assembly 304, and the engaging assembly 305 are disposed in the handle housing 301, and an exemplary arrangement position of assemblies is shown in FIG. 3. The controller 303 may be electrically connected with the human body detection sensor 302 via the handle housing 301, and may also be electrically connected with the servo assembly 304 via the handle housing 301. In an embodiment, as shown in FIG. 3, the servo assembly 304 may further include a motor 304a and a motor driving shaft 304b, and the engaging assembly 305 is controlled by the motor driving shaft 304b in the servo assembly 304. In an embodiment, the motor driving shaft 304b may be screwed with the motor 304a via threads, and the motor 304a may control the movement of the motor driving shaft 304b by screwing between the motor 304a itself and the motor driving shaft 304b, so that the engaging assembly is controlled by the motor driving shaft 304b.

Figure 4:
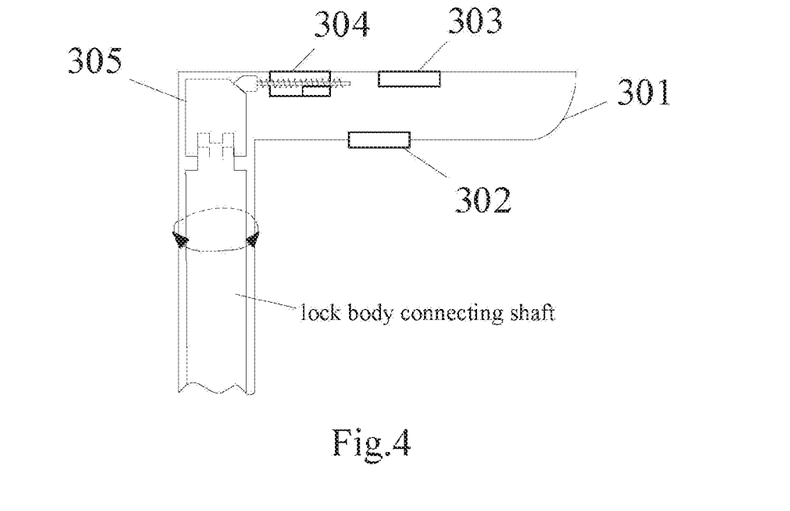
FIG. 4 is a schematic diagram of a door handle according to an embodiment.

As shown in FIG. 3, the engaging assembly 305 is in the first engaging state, and is connected with the lock body connecting shaft. At this time, when the door handle is rotated in the direction of the arrow in FIG. 3, the door handle may drive the lock body connecting shaft to rotate. FIG. 4 is a schematic diagram of a door handle according to an embodiment, and as shown in FIG. 4, the door handle includes the handle housing 301, the human body detection sensor 302, the controller 303, the servo assembly 304, and the engaging assembly 305. As shown in FIG. 4, the engaging assembly 305 is in a second engaging state, and is disengaged from the lock body connecting shaft, and at this time, the lock body connecting shaft cannot be driven to rotate when the door handle is rotated in the direction of the arrow in FIG. 4.

In an embodiment, as shown in FIGS. 3 and 4, the engaging assembly 305 may rotate with the handle housing 301, and is disposed corresponding to the lock body connecting shaft. In an embodiment, engaging structures are correspondingly disposed on the engaging assembly 305 and the lock body connecting shaft. A first engaging structure is disposed on one end of the engaging assembly 305 close to the lock body connecting shaft, a second engaging structure is correspondingly disposed on one end of the lock body connecting shaft close to the engaging assembly 305, and the first engaging structure and the second engaging structure may be engaged each other, so that the first engaging structure may drive the lock body connecting shaft to rotate with the second engaging structure when the engaging assembly 305 rotates. As shown in FIG. 3, when the engaging assembly 305 is in the first engaging state, the first engaging structure is engaged with the second engaging structure on one end of the lock body connecting shaft close to the engaging assembly 305; as shown in FIG. 4, when the engaging assembly 305 is in the second engaging state, the first engaging structure is disengaged from the second engaging structure on one end of the lock body connecting shaft close to the engaging assembly 305.

In the embodiment, when the engaging assembly 305 is in the first engaging state, the engaging assembly 305 is engaged with the lock body connecting shaft; and when the engaging assembly 305 is in the second engaging state, the engaging assembly 305 is disengaged from the lock body connecting shaft. As shown in FIG. 3, when the engaging assembly 305 is engaged with the lock body connecting shaft, the handle housing 301 is rotated to drive the engaging assembly 305 to rotate, and the engaging assembly 305 and the lock body connecting shaft are engaged to drive the lock body connecting shaft to rotate, so that unlocking is realized. As shown in FIG. 4, when the engaging assembly 305 is disengaged from the lock body connecting shaft, the engaging assembly 305 may be driven to rotate when the handle housing 301 is rotated, however, the engaging assembly 305 is disengaged from the lock body connecting shaft and cannot drive the lock body connecting shaft to rotate, so that rotation of the door handle cannot realize unlocking at this time.

The controller 303 may be provided inside the handle housing 301 or may be provided at a location other than the handle housing 301, for example, inside a lock of a safety door lock, inside a door in which the safety door lock is installed, or the like. That is, the controller 303 may be electrically connected with the human body detection sensor 302 and the servo assembly 304, and may receive sensor data of the human body detection sensor 302 and control the servo assembly 304. The specific arrangement position of the controller 303 is not limited in the embodiments of the present disclosure.

In an embodiment, the controller 303 may be used to instruct the servo assembly 304 to control the engaging assembly 305 to enter the first engaging state when the human body is detected according to the sensor data of the human body detection sensor 302. For example, taking a sensor disposed on a handle housing of a door handle as an example of the human body detection sensor 302, when the user holds the door handle, the human body detection sensor 302 may receive information of the user's hand, generate sensor data, and transmit the generated sensor data to the controller 303 by electrical connection with the controller, then the controller 303 analyzes the sensor data according to the received sensor data, and sends a control signal to the servo assembly 304 when the human body information is detected so as to instruct the servo assembly 304 to control the engaging assembly 305 to enter a first engaging state. As shown in FIG. 4, when the controller 303 detects the presence of a human body according to the received sensor data, it may transmit a control signal to the servo assembly 304 to control the motor in the servo assembly 304 to start operation, thereby changing the motor drive shaft from the state shown in FIG. 4 to the state shown in FIG. 3, and controlling the engaging assembly 305 to change from the second engaging state to the first engaging state.

In an embodiment, the controller 303 may instruct the servo assembly 304 to control the engaging assembly 305 to enter the second engaging state when no human body is detected according to the sensor data of the human body detection sensor 302. For example, taking a sensor disposed on a handle housing of a door handle as an example of the human body detection sensor 302, the human body detection sensor 302 continues to receive information during a time that the user holds the door handle to a time that the user releases the door handle, the information that may be received does not include human body information, and in the generated sensor data, there may be no human body information data, so that the human body detection sensor 302 transmits the generated sensor data to the controller 303 by the electrical connection at this time, and the controller 303 analyzes the sensor data according to the received sensor data. When no human body is detected, the controller 303 sends a control signal to the servo assembly 304, and instructs the servo assembly 304 to control the engaging assembly 305 to enter the second engaging state. As shown in FIG. 3, when the controller 303 detects no human body according to the received sensor data, the controller 303 may transmit a control signal to the servo assembly 304 to control the motor in the servo assembly 304 to start operation, thereby changing the motor drive shaft from the state shown in FIG. 3 to the state shown in FIG. 4, and controlling the engaging assembly 305 to change from the first engaging state to the second engaging state.

In an embodiment, the controller 303 may be used to instruct the servo assembly 304 to control the engaging assembly 305 to move in a direction approaching the lock body connecting shaft when a human body is detected according to the sensor data of the human body detection sensor 302, so that the engaging assembly 305 enters a first engaging state; that is, in the process of changing the motor drive shaft from the state shown in FIG. 4 to the state shown in FIG. 3 to control the engaging assembly 305 to change from the second engaging state to the first engaging state, the engaging assembly 305 moves in a direction approaching the lock body connecting shaft, so that the engaging assembly 305 may enter the first engaging state.

The controller 303 may be used to instruct the servo assembly 304 to control the engaging assembly 305 to move towards a direction away from the lock body connecting shaft when no human body is detected according to the sensor data of the human body detection sensor 302, so that the engaging assembly 305 enters the second engaging state. That is, in the process of changing the motor drive shaft from the state shown in FIG. 3 to the state shown in FIG. 4 to control the engaging assembly 305 to change from the first engaging state to the second engaging state, the engaging assembly 305 moves in a direction away from the lock body connecting shaft, so that the engaging assembly 305 may enter the second engaging state.

In an embodiment, the human body detection sensor 302 in the door handle may include at least one of the following sensors: a human body heat release infrared sensor disposed on the handle housing; a finger vein sensor disposed on the handle housing; a fingerprint sensor disposed on the handle housing; a touch sensor disposed on the handle housing; a face detection sensor disposed outside the handle housing; or an iris detection sensor disposed outside the handle housing. That is, the human body detection sensor 302 may be disposed on the handle housing, or may be disposed on a safety door lock or a door controlled by the door handle, which is not limited in this embodiment of the present disclosure. The touch sensor may include a resistive touch sensor, a capacitive touch sensor, and a surface acoustic wave touch sensor, and the generated sensor data is transmitted to the controller for detection by the controller, similar to the implementation principle of a touch screen. For example, when the human body detection sensor 302 is a human body heat release infrared sensor, the user holds the door handle by hand, the human body heat release infrared sensor disposed on the handle housing of the door handle may generate sensor data, transmit the generated sensor data to the electrically connected controller, and detect whether a human body exists by the controller according to the sensor data transmitted by the human body detection sensor, thereby instructing the servo assembly to perform a responsive action. Application principles of other human body detection sensors are also similar.

In the present disclosure, the door handle is installed corresponding to a lock body connecting shaft of the safety door lock. The door handle includes a human body detection sensor, a controller, a servo assembly and an engaging assembly. The controller is respectively electrically connected with the human body detection sensor and the servo assembly, and the engaging assembly is controlled by the servo assembly. The engaging assembly includes a first engaging state and a second engaging state. When the engaging assembly is in the first engaging state, the door handle has the capability of driving the lock body connecting shaft to rotate; and when the engaging assembly is in the second engaging state, the door handle has no the capability of driving the lock body connecting shaft to rotate. The present disclosure uses cooperation of the human body detection sensor and the servo assembly, so that the servo assembly controls the engaging assembly to be in the first engaged state or the second engaged state, and the door handle has the capability of driving the locking body to rotate when the engaging assembly is in the first engaged state, so that the user can rotate the door handle and drive the lock body to rotate, so as to unlock and open the door without extra mechanical switches, and thus the present disclosure simultaneously possesses the function of preventing from unlocking through a peephole and improves the efficiency of opening the door.

Figure 5:
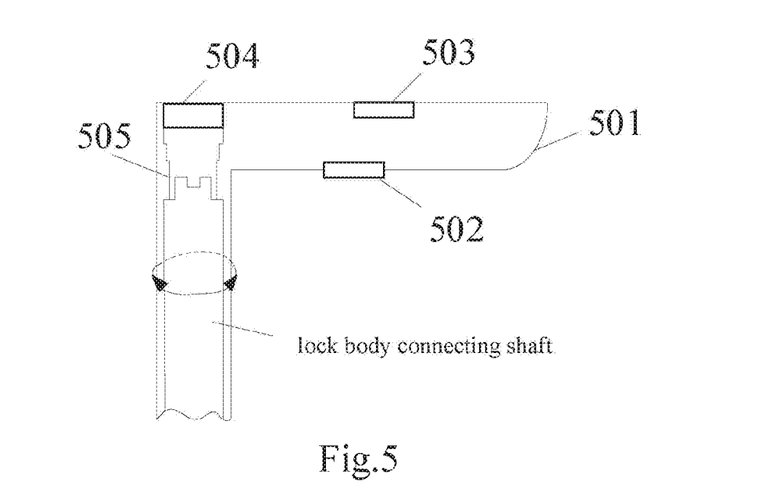
FIG. 5 is a schematic diagram of a door handle according to an embodiment.

In an embodiment, the servo assembly may directly control the engaging assembly to switch between the first engaging state and the second engaging state. FIG. 5 is a schematic diagram of a door handle according to an embodiment, and as shown in FIG. 5, the door handle may be installed corresponding to the lock body connecting shaft of the safety door lock, and the lock body connecting shaft of the safety door lock may be the lock body connecting shaft shown in FIGS. 1A and 1B. As shown in FIG. 5, the door handle includes a handle housing 501, a human body detection sensor 502, a controller 503, a servo assembly 504, and an engaging assembly 505.

The controller 503 is electrically connected with the human body detection sensor 502 and the servo assembly 504 respectively, and the engaging assembly 505 is controlled by the servo assembly 504. The engaging assembly 505 includes a first engaging state and a second engaging state; the door handle has a capability of driving the lock body connecting shaft to rotate when the engaging assembly 505 is in the first engaging state; and the door handle has no the capability of driving the lock body connecting shaft to rotate when the engaging assembly 505 is in the second engaging state.

The human body detection sensor 502, the controller 503, the servo assembly 504, and the engaging assembly 505 are disposed in the handle housing 501, and an exemplary arrangement position of assemblies is shown in FIG. 5. The controller 503 may be electrically connected with the human body detection sensor 502 via the handle housing 501, and may also be electrically connected with the servo assembly 504 via the handle housing 501. The engaging assembly 505 may also be directly connected with the servo assembly 504, and when the servo assembly 504 is driven to directly bring the engaging assembly 505 to be switched between the first engaging state and the second engaging state, so that the engaging assembly 505 is controlled by the servo assembly 504.

Figure 6:
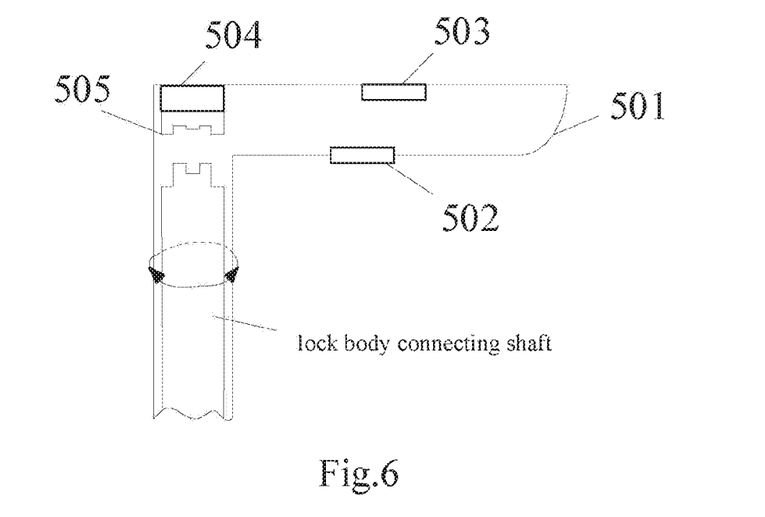
FIG. 6 is a schematic diagram of a door handle according to an embodiment.

As shown in FIG. 5, the engaging assembly 505 is in the first engaging state, and is connected with the lock body connecting shaft. At this time, when the door handle is rotated in the direction of the arrow in FIG. 5, the door handle may drive the lock body connecting shaft to rotate. FIG. 6 is a schematic diagram of a door handle according to an embodiment, and as shown in FIG. 6, the door handle includes the handle housing 501, the human body detection sensor 502, the controller 503, the servo assembly 504, and the engaging assembly 505. As shown in FIG. 6, the engaging assembly 505 is in a second engaging state, and is disengaged from the lock body connecting shaft, and at this time, the lock body connecting shaft cannot be driven to rotate when the door handle is rotated in the direction of the arrow in FIG. 6.

In an embodiment, as shown in FIGS. 5 and 6, the engaging assembly 505 may rotate with the handle housing, and the engaging assembly 505 is disposed corresponding to the lock body connecting shaft. In an embodiment, engaging structures are correspondingly disposed on the engaging assembly 505 and the lock body connecting shaft. A first engaging structure is disposed on one end of the engaging assembly 505 close to the lock body connecting shaft, a second engaging structure is correspondingly disposed on one end of the lock body connecting shaft close to the engaging assembly 505, and the first engaging structure and the second engaging structure may be engaged each other (at the first engaging state at this time), so that the first engaging structure may drive the lock body connecting shaft to rotate with the second engaging structure when the engaging assembly 505 rotates. As shown in FIG. 5, when the engaging assembly 505 is in the first engaging state, the first engaging structure is engaged with the second engaging structure on one end of the lock body connecting shaft close to the engaging assembly 505; as shown in FIG. 6, when the engaging assembly 505 is in the second engaging state, the first engaging structure is disengaged from the second engaging structure on one end of the lock body connecting shaft close to the engaging assembly 505.

As shown in FIG. 5, when the engaging assembly 505 is engaged with the lock body connecting shaft, the handle housing is rotated to drive the engaging assembly 505 to rotate, and the engaging assembly 505 and the lock body connecting shaft are engaged to drive the lock body connecting shaft to rotate, so that unlocking is realized. As shown in FIG. 6, when the engaging assembly 505 is disengaged from the lock body connecting shaft, the engaging assembly 505 may be driven to rotate when the handle housing 501 is rotated, however, the engaging assembly 505 is disengaged from the lock body connecting shaft and cannot drive the lock body connecting shaft to rotate, so that rotation of the door handle cannot realize unlocking at this time.

In an embodiment, the controller 503 may be used to instruct the servo assembly 504 to control the engaging assembly 505 to enter the first engaging state (as shown in FIG. 5) when a human body is detected according to the sensor data of the human body detection sensor 502. And, the servo assembly 504 is instructed to control the engaging assembly 505 to enter a second engaging state (as shown in FIG. 6) when no human body is detected according to the sensor data of the human body detection sensor 502. The operation of the controller 503 in this embodiment is similar to that of the controller in the above embodiment, and will not be repeated herein. In addition, the arrangement position of the controller 503 in this embodiment may also refer to the arrangement position of the controller in the above embodiment. It should be noted that, in this embodiment, the servo assembly 504 directly controls the engaging assembly 505 to enter the first engaging state or the second engaging state, and in an embodiment, i.e., the engaging assembly 505 is a part of the servo assembly 504, which should also be within the protection scope of the present disclosure.

In an embodiment, the operation of the human body detection sensor 502 in this embodiment is also similar to the operation of the human body detection sensor in the above embodiment, and various types of the human body detection sensor may also refer to the description in the above embodiment, which is not repeated herein.

In the present disclosure, the door handle is installed corresponding to a lock body connecting shaft of the safety door lock. The door handle includes a human body detection sensor, a controller, a servo assembly and an engaging assembly. The controller is respectively electrically connected with the human body detection sensor and the servo assembly, and the engaging assembly is controlled by the servo assembly. The engaging assembly includes a first engaging state and a second engaging state. When the engaging assembly is in the first engaging state, the door handle has the capability of driving the lock body connecting shaft to rotate; and when the engaging assembly is in the second engaging state, the door handle has no the capability of driving the lock body connecting shaft to rotate. The present disclosure uses cooperation of the human body detection sensor and the servo assembly, so that the servo assembly controls the engaging assembly to be in the first engaged state or the second engaged state, and the door handle has the capability of driving the locking body to rotate when the engaging assembly is in the first engaged state, so that the user can rotate the door handle and drive the lock body to rotate, so as to unlock and open the door without extra mechanical switches, and thus the present disclosure simultaneously possesses the function of preventing from unlocking through a peephole and improves the efficiency of opening the door.

In the embodiments shown in FIGS. 3, 4, 5 and 6, the door handle may not have the capability of driving the lock body connecting shaft to rotate in the first engaging state corresponding to FIGS. 3 and 5, and the door handle has the capability of driving the lock body connecting shaft to rotate in the second engaging state corresponding to FIGS. 4 and 6. That is, in a case that the first engaging structure disposed on one end of the engaging assembly close to the lock body connecting shaft is disengaged from the second engaging structure disposed on one end of the lock body connecting shaft close to the engaging assembly, the door handle has the capability of driving the locking body to rotate, and in a case that the first engaging structure disposed on one end of the engaging assembly close to the lock body connecting shaft is engaged with the second engaging structure disposed on one end of the lock body connecting shaft close to the engaging assembly, the door handle has no the capability of driving the locking body to rotate. The embodiments of the present disclosure are not limited thereto.

Figure 7:
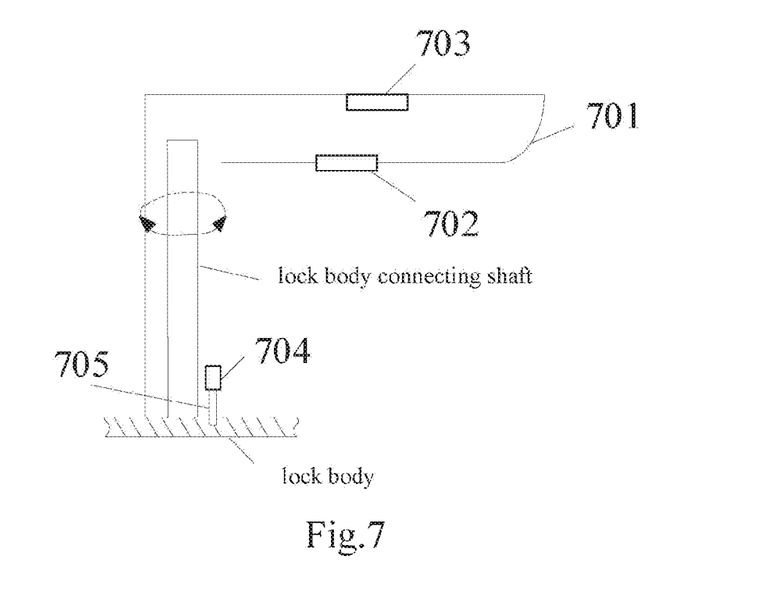
FIG. 7 is a schematic diagram of a door handle according to an embodiment.

In an embodiment, the door handle may not drive the lock body connecting shaft to rotate by the engaging assembly, i.e., the door handle may be directly connected with the lock body connecting shaft, and when the door handle rotates, the lock body connecting shaft is driven to rotate. FIG. 7 is a schematic diagram of a door handle according to an embodiment, and as shown in FIG. 7, the door handle may be installed corresponding to the lock body connecting shaft of the safety door lock, and the lock body connecting shaft of the safety door lock may be the lock body connecting shaft shown in FIGS. 1A and 1B. As shown in FIG. 7, the door handle includes a handle housing 701, a human body detection sensor 702, a controller 703, a servo assembly 704, and an engaging assembly 705.

The controller 703 is electrically connected with the human body detection sensor 702 and the servo assembly 704 respectively, and the engaging assembly 705 is controlled by the servo assembly 704. The engaging assembly 705 includes a first engaging state and a second engaging state; the door handle has the capability of rotating when the engaging assembly 705 is in one engaging state; and the door handle has no the capability of rotating when the engaging assembly 705 is in the other engaging state.

The human body detection sensor 702, the controller 703, the servo assembly 704, and the engaging assembly 705 are disposed in the handle housing 701, and an exemplary arrangement position of assemblies is shown in FIG. 7. The controller 703 may be electrically connected with the human body detection sensor 702 via the handle housing 701, and may also be electrically connected with the servo assembly 704 via the handle housing 701. The engaging assembly 705 may also be directly connected with the servo assembly 704, and when the servo assembly 704 is driven to directly bring the engaging assembly 705 to be switched between the first engaging state and the second engaging state, so that the engaging assembly 705 is controlled by the servo assembly 704.

Figure 8:
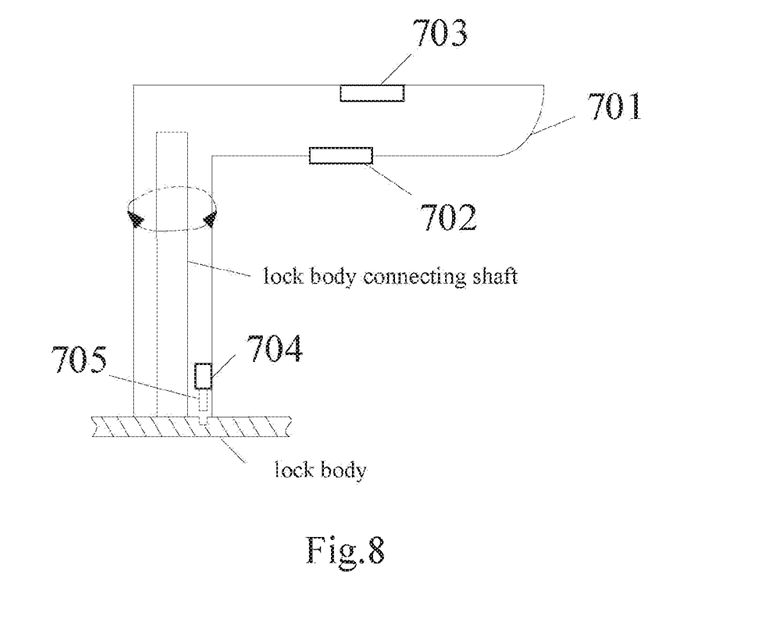
FIG. 8 is a schematic diagram of a door handle according to an embodiment.

As shown in FIG. 7, the engaging assembly 705 is in the first engaging state, and the engaging assembly 705 and the lock body are connected with each other, and at this time, when the door handle is rotated in the direction of the arrow shown in FIG. 7, the door handle cannot be rotated together with the lock body connecting shaft. FIG. 8 is a schematic diagram of a door handle according to an embodiment, where the door handle includes the handle housing 701, the human body detection sensor 702, the controller 703, the servo assembly 704, and the engaging assembly 705. As shown in FIG. 8, the engaging assembly 705 is in the second engaging state, and the engaging assembly 705 and the lock body are disengaged from each other, and at this time, when the door handle is rotated in the direction of the arrow shown in FIG. 8, the door handle may be rotated together with the lock body connecting shaft.

As shown in FIG. 7 and FIG. 8, engaging structures are correspondingly disposed between the engaging assembly 705 and the lock body. A first engaging structure is disposed on one end of the engaging assembly 705 close to the lock body, and a second engaging structure is correspondingly disposed on one end of the lock body close to the engaging assembly 705, and the first engaging structure may be engaged with the second engaging structure (at the first engaging state at this time). The door handle may be locked through first engaging structure and second engaging structure, so that the door handle may not be rotated with the lock body connecting shaft. As shown in FIG. 7, when the engaging assembly 705 is in the second engaging state, the first engaging structure is engaged with the second engaging structure on one end of the lock body close to the engaging assembly 705. As shown in FIG. 8, when the engaging assembly 705 is in the first engaging state, the first engaging structure is disengaged from the second engaging structure on one end of the lock body close to the engaging assembly 705. The disengagement of the first engaging structure and the second engaging structure enables the door handle to rotate together with the lock body connecting shaft.

In an embodiment, the controller 703 may be used to instruct the servo assembly 704 to control the engaging assembly 705 to enter the first engaging state (as shown in FIG. 8) when a human body is detected according to the sensor data of the human body detection sensor 702. And, the servo assembly 704 is instructed to control the engaging assembly 705 to enter a second engaging state (as shown in FIG. 7) when no human body is detected according to the sensor data of the human body detection sensor 702. The operation of the controller 703 in this embodiment is similar to that of the controller in the above embodiment, and will not be repeated herein. In addition, the arrangement position of the controller 703 in this embodiment may also refer to the arrangement position of the controller in the above embodiment. In an embodiment, the operation of the human body detection sensor 702 in this embodiment is also similar to the operation of the human body detection sensor in the above embodiment, and various types of the human body detection sensor may also refer to the description in the above embodiment, which is not repeated herein.

In the present disclosure, the door handle is installed corresponding to a lock body connecting shaft of the safety door lock. The door handle includes a human body detection sensor, a controller, a servo assembly and an engaging assembly. The controller is respectively electrically connected with the human body detection sensor and the servo assembly, and the engaging assembly is controlled by the servo assembly. The engaging assembly includes a first engaging state and a second engaging state. When the engaging assembly is in the first engaging state, the door handle has the capability of driving the lock body connecting shaft to rotate; and when the engaging assembly is in the second engaging state, the door handle has no the capability of driving the lock body connecting shaft to rotate. The present disclosure uses cooperation of the human body detection sensor and the servo assembly, so that the servo assembly controls the engaging assembly to be in the first engaged state or the second engaged state, and the door handle has the capability of driving the locking body to rotate when the engaging assembly is in the first engaged state, so that the user can rotate the door handle and drive the lock body to rotate, so as to unlock and open the door without extra mechanical switches, and thus the present disclosure simultaneously possesses the function of preventing from unlocking through a peephole and improves the efficiency of opening the door.

Figure 9:
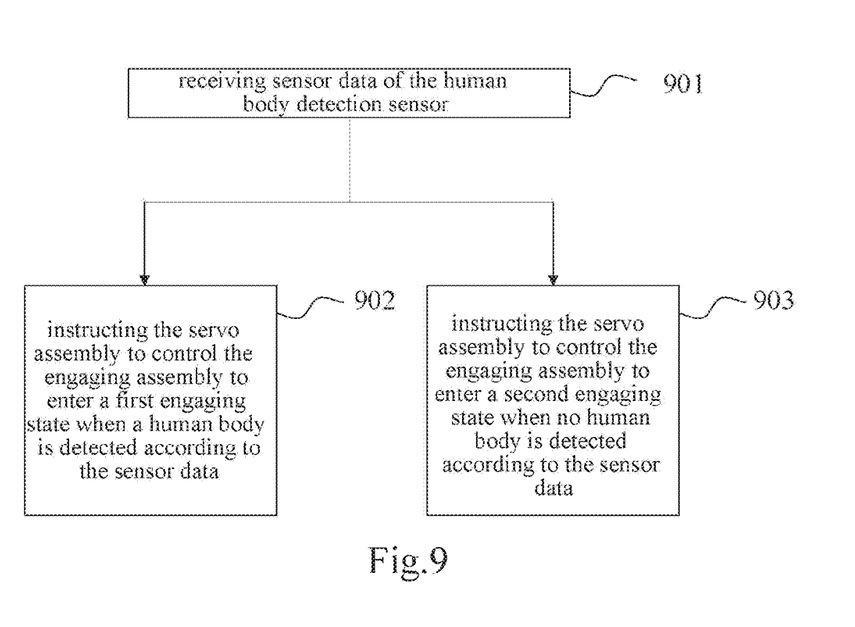
FIG. 9 is a flow chart of a control method of a door handle according to an embodiment.

FIG. 9 is a flowchart of a control method of a door handle according to an embodiment, and the method may be performed by a controller in the door handle described in the above embodiments.

As shown in FIG. 9, the control method of the door handle may include step 901: receiving sensor data of the human body detection sensor.

The controller may receive the sensor data transmitted from the human body detection sensor and detect the sensor data. In an embodiment, the controller may transmit the sensor data through an electrical connection circuit between the human body detection sensors. In an embodiment, when the human body information is received by the human body detection sensor, the sensor data is correspondingly generated, the sensor data is sent to the controller, and the controller detects whether the sensor data belongs to the sensor data of the human body.

In an embodiment, the human body detection sensor may include at least one of the following sensors: a human body heat release infrared sensor disposed on the handle housing; a finger vein sensor disposed on the handle housing; a fingerprint sensor disposed on the handle housing; a touch sensor disposed on the handle housing; a face detection sensor disposed outside the handle housing; or an iris detection sensor disposed outside the handle housing. For example, when the user holds the door handle by hand, the human body detection sensor on the door handle may generate corresponding sensor data by the hand and transmit the sensor data to the controller. When the human body detection sensor is an iris detection sensor, the iris detection sensor may receive iris information of the user, generate corresponding sensor data and send the sensor data to the controller. Accordingly, the controller receives sensor data of various human body detection sensors.

The method further includes step 902: instructing the servo assembly to control the engaging assembly to enter a first engaging state when a human body is detected according to the sensor data.

When the controller detects a human body according to the received sensor data, a control instruction is sent to the servo assembly to instruct the servo assembly to drive, so that the engaging assembly is controlled by the servo assembly to enter a first engaging state.

According to the above embodiments, a first engaging structure is disposed on one end of the engaging assembly close to the lock body connecting shaft; and the engaging structure is engaged with the second engaging structure on one end of the lock body connecting shaft close to the engaging assembly when the engaging assembly is in the first engaging state. That is, when the human body is detected according to the sensor data of the human body detection sensor, the controller may instruct the servo assembly to control the engaging assembly to move in a direction approaching the connecting shaft of the lock body so that the engaging assembly enters the first engaging state, such as the process from FIG. 4 to FIG. 3, or from the process of FIG. 6 to FIG. 5 as mentioned above; when the engaging assembly is in the first engaging state, the door handle has the capability of driving the lock body connecting shaft to rotate.

In the embodiment of FIG. 7, the controller may control the engaging assembly to enter the first engaging state shown in FIG. 8, and the first engaging structure is disengaged from the second engaging structure on one end of the lock body close to the engaging assembly. When the engaging assembly is in the first engaging state, the door handle has the capability of driving the lock body connecting shaft to rotate.

The method further includes step 903: instructing the servo assembly to control the engaging assembly to enter a second engaging state when no human body is detected according to the sensor data.

When no human body is detected by the controller according to the received sensor data, the controller sends a control instruction to the servo assembly to instruct the servo assembly to drive, so that the engaging assembly is controlled to enter the second engaging state through the servo assembly.

When the engaging assembly is in the second engaging state, the first engaging structure is disengaged from the second engaging structure on one end of the lock body connecting shaft close to the engaging assembly; and when the engaging assembly is in the second engaging state, the door handle has no the capability of driving the lock body connecting shaft to rotate. That is, when no human body is detected according to the sensor data of the human body detection sensor, the controller may instruct the servo assembly to control the engaging assembly to move in a direction away from the lock body connecting shaft, so that the engaging assembly enters the second engaging state, such as the process from FIG. 3 to FIG. 4, or the process from FIG. 5 to FIG. 6; and when the engaging assembly is in the second engaging state, the door handle has no the capability of driving the lock body connecting shaft to rotate.

In the embodiment of FIG. 7, the controller may control the engaging assembly to enter the second engaging state shown in FIG. 7, and the first engaging structure is engaged with the second engaging structure on one end of the lock body close to the engaging assembly. When the engaging assembly is in the second engaging state, the door handle has no the capability of driving the lock body connecting shaft to rotate.

In the present disclosure, the door handle is installed corresponding to a lock body connecting shaft of the safety door lock. The door handle includes a human body detection sensor, a controller, a servo assembly and an engaging assembly. The controller is respectively electrically connected with the human body detection sensor and the servo assembly, and the engaging assembly is controlled by the servo assembly. The engaging assembly includes a first engaging state and a second engaging state. When the engaging assembly is in the first engaging state, the door handle has the capability of driving the lock body connecting shaft to rotate; and when the engaging assembly is in the second engaging state, the door handle has no the capability of driving the lock body connecting shaft to rotate. The present disclosure uses cooperation of the human body detection sensor and the servo assembly, so that the servo assembly controls the engaging assembly to be in the first engaged state or the second engaged state, and the door handle has the capability of driving the locking body to rotate when the engaging assembly is in the first engaged state, so that the user can rotate the door handle and drive the lock body to rotate, so as to unlock and open the door without extra mechanical switches, and thus the present disclosure simultaneously possesses the function of preventing from unlocking through a peephole and improves the efficiency of opening the door.

The following are device embodiments corresponding to method embodiments of the present disclosure. For details of the device embodiments, reference may be made to the method embodiments of the present disclosure.

Figure 10:
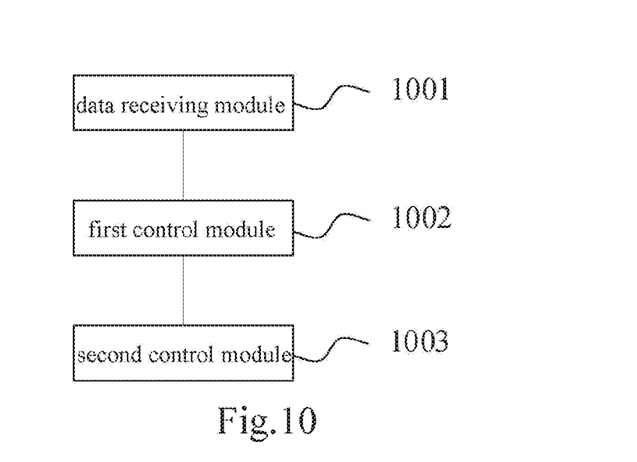
FIG. 10 is a block diagram of a door handle control device according to an embodiment.

FIG. 10 is a block diagram of a door handle control device according to an embodiment. The device may be used in the controller of the door handle in the various embodiments described above. As shown in FIG. 10, the door handle control device may include: a data receiving module 1001 used to receive sensor data of the human body detection sensor; a first control module 1002 used to instruct the servo assembly to control the engaging assembly to enter a first engaging state when a human body is detected according to the sensor data; and a second control module 1003 used to instruct the servo assembly to control the engaging assembly to enter a second engaging state when no human body is detected according to the sensor data; wherein the door handle has a capability of driving the lock body connecting shaft to rotate when the engaging assembly is in the first engaging state; and the door handle has no the capability of driving the lock body connecting shaft to rotate when the engaging assembly is in the second engaging state.

In an embodiment, a first engaging structure is provided on one end of the engaging assembly close to the lock body connecting shaft; the first engaging structure is engaged with a second engaging structure on one end of the lock body connecting shaft close to the engaging assembly when the engaging assembly is in the first engaging state; and the first engaging structure is disengaged from a second engaging structure on one end of the lock body connecting shaft close to the engaging assembly when the engaging assembly is in the second engaging state.

In an embodiment, the first control module 1002 is used to: instruct the servo assembly to control the engaging assembly to move towards a direction close to the lock body connecting shaft when the human body is detected according to the sensor data of the human body detection sensor, so that the engaging assembly enters the first engaging state; and the second control module 1003 is used to: instruct the servo assembly to control the engaging assembly to move in a direction away from the lock body connecting shaft when the human body is detected according to the sensor data of the human body detection sensor, so that the engaging assembly enters the second engaging state.

In an embodiment, the human body detection sensor includes at least one of the following sensors: a human body heat release infrared sensor disposed on a handle housing of the door handle; a finger vein sensor disposed on the handle housing of the door handle; a fingerprint sensor disposed on the handle housing of the door handle; a touch sensor disposed on the handle housing of the door handle; a face detection sensor disposed outside the handle housing of the door handle; or an iris detection sensor disposed outside the handle housing of the door handle.

Those skilled in the art will appreciate that each of the above described modules may be implemented in hardware, or software, or a combination of hardware and software. In an embodiment, the door handle control device may be implemented as a processor and a memory storing instructions executable by the processor. The processor is configured to configured to perform the operations of the above-described modules. When implemented in software, these functions may be stored in a computer-readable medium or transmitted as one or more instructions or codes on a computer-readable medium. The computer-readable medium includes both a computer storage medium and a communication medium including any medium that facilitates transfer of a computer program from one place to another. The storage medium may be any available medium that can be accessed by a general or specific computer.

The embodiments of the present disclosure also provide a computer-readable storage medium having executable instructions stored therein that are invoked by a processor to implement the control method of the door handle described above.

Figure 11:
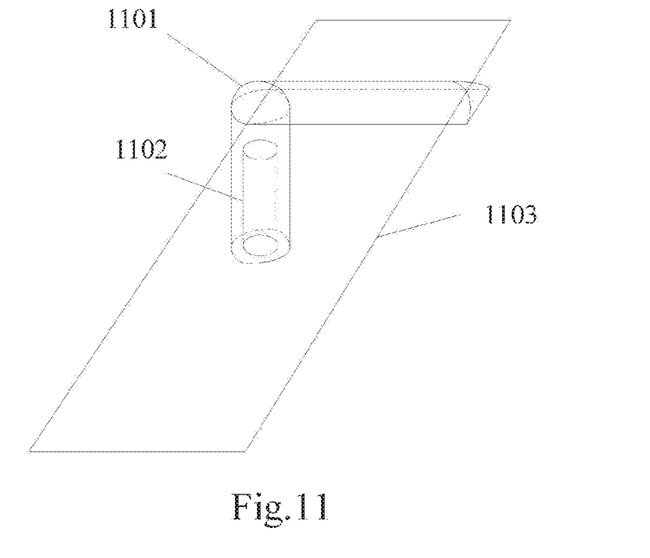
FIG. 11 is a schematic diagram of a safety door lock according to an embodiment.

FIG. 11 is a schematic diagram of a safety door lock according to an embodiment, and as shown in FIG. 11, the safety door lock includes a door handle 1101, a lock body connecting shaft 1102, and a lock body 1103.

The door handle 1101 may be any door handle provided in the above embodiments, and the door handle may be provided with the human body detection sensor and the controller in the above embodiments. The controller detects the sensor data transmitted by the human body detection sensor, and the controller may control the door handle in the manner described in the above embodiments.

In an embodiment, when the user holds the shown door handle, the human body detection sensor may transmit the sensor data to the controller, and accordingly, when the human body is detected by the controller, the controller may control the servo assembly in the door handle to work, so that when the user rotates the door handle, the lock body connecting shaft may also rotate along with the door handle, and the lock body is unlocked.

In an embodiment, the controller installed in the door handle may also be disposed in the lock body of the safety door lock or disposed in the lock body connecting shaft, which is not limited by the embodiments of the present disclosure.

When the user opens the door in the above-mentioned manner, the sensor data may be sent to the controller through the human body detection sensor. When the human body is detected by the human body detection sensor, the state that the door handle has no capability of driving the lock body connecting shaft to rotate is changed into the state that the door handle has the capability of driving the lock body connecting shaft to rotate, so that the safety door lock may be opened when the user rotates the door handle, thereby achieving the effect of door opening. In an embodiment, an iris detection sensor or a face detection sensor is disposed on the safety door, i.e., when the human body detection sensor is an iris detection sensor or a face detection sensor, it may be disposed on the safety door.

Other embodiments of the present disclosure will be apparent to those skilled in the art after considering the specification and practice of the invention disclosed herein. The present disclosure is intended to cover any variations, uses, or adaptations of the present disclosure, which follows general principles of the present disclosure and includes the common knowledge or customary technical means in the art that are not disclosed in the present disclosure. The specification and embodiments are considered as exemplary embodiments only, the true scope and spirit of the present disclosure is indicated by the appended claims.

It should be understood that the present disclosure is not limited to the precise structures described above and illustrated in the drawings, and that various modifications and changes may be made without departing from the scope thereof. The scope of the present disclosure is limited only by the appended claims.

What is claimed is:

1. A door handle, connected with a lock body connecting shaft of a safety door lock and configured to drive the lock body connecting shaft to rotate, the door handle comprising:
a human body detection sensor, a controller, a servo assembly, and an engaging assembly;
wherein the controller is electrically connected with the human body detection sensor and the servo assembly, and the engaging assembly is controlled by the servo assembly; and
the engaging assembly comprises a first engaging state and a second engaging state, wherein when the engaging assembly is in the second engaging state, the engaging assembly and a lock body are connected with each other, and the door handle is unable to be rotated together with the lock body connecting shaft; and when the engaging assembly is in the first engaging state, the engaging assembly and the lock body are disengaged from each other, and the door handle is able to be rotated together with the lock body connecting shaft.

2. The door handle according to claim 1, wherein the controller is configured to:
  instruct the servo assembly to control the engaging assembly to enter the first engaging state when a human body is detected by the human body detection sensor; and
  instruct the servo assembly to control the engaging assembly to enter the second engaging state when no human body is detected by the human body detection sensor.

3. The door handle according to claim 1, wherein the human body detection sensor comprises at least one of:
  a human body heat release infrared sensor disposed on a handle housing of the door handle;
  a finger vein sensor disposed on the handle housing of the door handle;
  a fingerprint sensor disposed on the handle housing of the door handle;
  a touch sensor disposed on the handle housing of the door handle;
  a face detection sensor disposed outside the handle housing of the door handle; or
  an iris detection sensor disposed outside the handle housing of the door handle.

4. A control method of a door handle, wherein the method is performed by the controller in the door handle according to claim 1, the method comprising:
  receiving sensor data of the human body detection sensor;
  instructing the servo assembly to control the engaging assembly to enter the first engaging state when a human body is detected according to the sensor data; and
  instructing the servo assembly to control the engaging assembly to enter the second engaging state when no human body is detected according to the sensor data.

5. The method according to claim 4, wherein the body detection sensor comprises at least one of:
  a human body heat release infrared sensor disposed on a handle housing of the door handle;
  a finger vein sensor disposed on the handle housing of the door handle;
  a fingerprint sensor disposed on the handle housing of the door handle;
  a touch sensor disposed on the handle housing of the door handle;
  a face detection sensor disposed outside the handle housing of the door handle; or
  an iris detection sensor disposed outside the handle housing of the door handle.

6. A door handle control device, for use in the controller of the door handle according to claim 1, the door handle control device comprising:
  a processor; and
  a memory storing instructions by the processor;
  wherein the processor is configured to:
    receive sensor data of the human body detection sensor;
    instruct the servo assembly to control the engaging assembly to enter the first engaging state when a human body is detected according to the sensor data; and
    instruct the servo assembly to control the engaging assembly to enter the second engaging state when no human body is detected according to the sensor data.

7. The door handle control device according to claim 6, wherein the human body detection sensor comprises at least one of:
  a human body heat release infrared sensor disposed on a handle housing of the door handle;
  a finger vein sensor disposed on the handle housing of the door handle;
  a fingerprint sensor disposed on the handle housing of the door handle;
  a touch sensor disposed on the handle housing of the door handle;
  a face detection sensor disposed outside the handle housing of the door handle; or
  an iris detection sensor disposed outside the handle housing of the door handle.

\* \* \* \* \*